United States Patent [19]
Kerr et al.

[11] 3,820,771
[45] June 28, 1974

[54] ENERGY ABSORBING UNIT

[75] Inventors: Lamar L. Kerr, Centerville; James M. Pees, Dayton; Robert J. Riner, Centerville, all of Ohio

[73] Assignee: General Motors Corporation, Detroit, Mich.

[22] Filed: Nov. 24, 1972

[21] Appl. No.: 309,260

[52] U.S. Cl............ 267/116, 293/1, 293/9, 293/24, 293/60, 293/70, 293/73, 293/85, 293/86, 293/89, 213/43, 213/223
[51] Int. Cl............................................. F16f 5/00
[58] Field of Search......... 293/1, 9, 24, 60, 70, 73, 293/85, 86, 89; 267/64 R, 116, 139, 140; 213/43, 223

[56] References Cited
UNITED STATES PATENTS

| | | | |
|---|---|---|---|
| 2,724,590 | 11/1955 | Irwin | 267/64 R |
| 3,163,262 | 12/1964 | Allinquant | 267/64 R |
| 3,700,273 | 10/1972 | Jackson et al. | 267/139 |

FOREIGN PATENTS OR APPLICATIONS

| | | | |
|---|---|---|---|
| 1,280,548 | 11/1961 | France | 293/DIG. 2 |

Primary Examiner—James B. Marbert
Attorney, Agent, or Firm—W. E. Finken

[57] ABSTRACT

An improved energy absorbing unit of the hydropneumatic type wherein the rate at which the unit returns to a fully extended condition after an impact stroke is retarded, the unit including a piston tube subassembly telescopically disposed on a cylinder tube subassembly, a metering pin on the cylinder tube subassembly adapted for cooperation with an aperture on the piston tube subassembly in defining a primary orifice for throttling the flow of working fluid thereby to effect energy absorption during telescopic collapse of the unit, and a valve disc on the piston tube subassembly adapted for sliding and sealing engagement on the metering pin and movable by the latter during telescopic extension of the unit to a closed position closing the primary orifice and defining a secondary orifice for throttling the flow of working fluid thereby to retard relative telescopic extension.

4 Claims, 8 Drawing Figures

PATENTED JUN 28 1974

ENERGY ABSORBING UNIT

This invention relates generally to collapsible, self-restoring energy absorbing units and more particularly to a unit wherein the rate of restoration is retarded.

The primary feature of this invention is that it provides an improved energy absorbing unit, the unit being particularly adapted for supporting a collision bumper bar on an automobile vehicle body. Another feature of this invention is that it provides an improved energy absorbing unit of the hydropneumatic type including a pair of telescopically related tubes, a fixed piston on one tube cooperating with a metering pin on the other tube in providing a variable area orifice for throttling the flow of a working fluid during relative telescopic collapse between the tubes, and a free piston defining a gas chamber in which a gas is compressed during collapse of the unit to provide sufficient potential energy for effecting restoration or relative telescopic extension between the tubes. Yet another feature of this invention resides in the provision in the improved unit of a valve member adapted to retard the rate of relative telescopic extension between the tubes. Still another feature of this invention resides in the provision in the improved unit of a valve member which cooperates with the metering pin in retarding the rate of relative telescopic extension between the tubes by directing the flow of working fluid through a plurality of passages of predetermined size, the passages functioning to throttle the fluid for retarding restoration. A further feature of this invention is that it provides an improved energy absorbing unit wherein the valve member is fabricated as a plastic disc including a radially expandable aperture adapted to slidingly and sealingly engage the metering pin during collapse and restoration of the unit, the relatively tight engagement between the and restoration and the pin functioning to positively locate the the valve member in an open position during collapse and in a closed position during restoration and to positively direct fluid flow during restoration through the throttling passages. A still further feature of this invention resides in the provision in the improved unit of a plurality of radially extending grooves in a surface of the valve disc, the grooves defining a plurality of passages for throttling the flow of working fluid during restoration of the unit. These and other features of this invention will be readily apparent from the following specification and from the drawings wherein:

Figure 1:
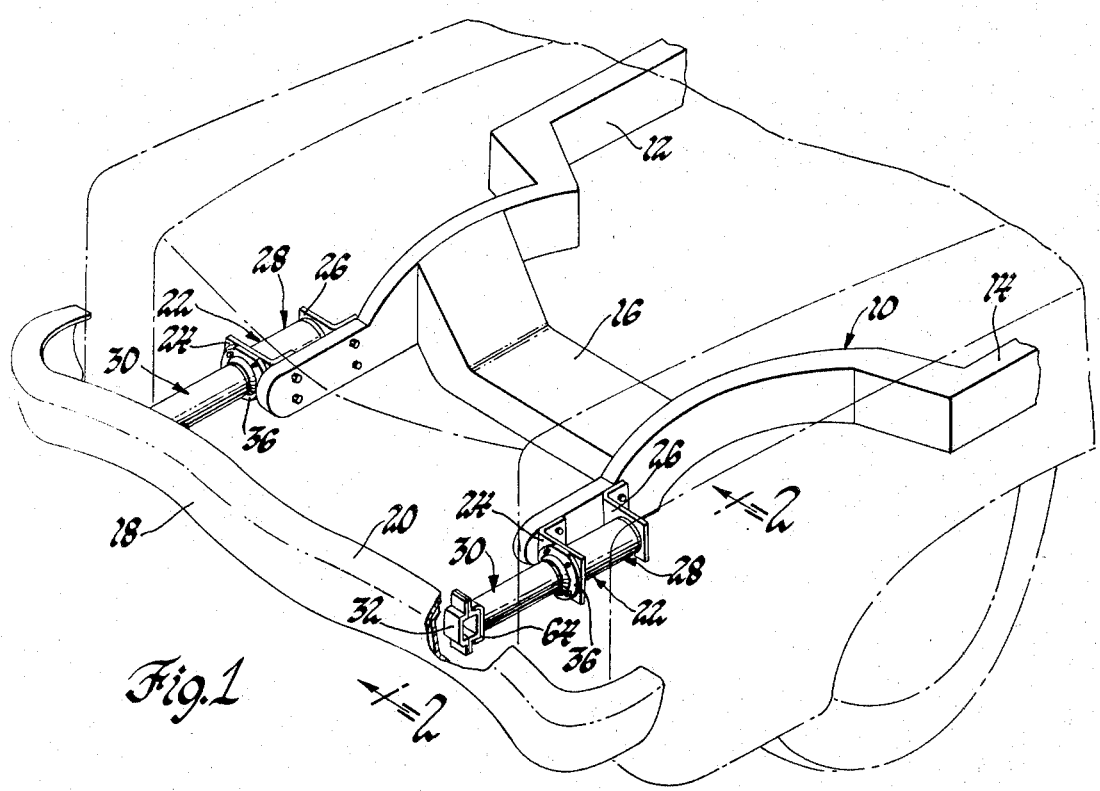
FIG. 1 is a perspective view of the forward portion of an automobile frame having a collision bumper structure supported thereon by a pair of energy absorbing units according to this invention.

Referring now to FIG. 1 of the drawings, there shown in simplified form is an automobile frame designated generally 10 including a pair of longitudinally extending side rails 12 and 14, the side rails being interconnected at the forward end of the frame by a rigid cross member 16. A collision bumper structure 18, including a bumper bar 20, is supported on the frame by a pair of identical energy absorbing units according to this invention designated generally 22, each support unit being rigidly attached to the corresponding one of the frame rails 12 and 14 by a front bracket 24 and a rear bracket 26. It will be understood, of course, that rather than the separate frame illustrated herein the energy absorbing units according to this invention are equally well adapted for use with unibody vehicle constructions.

Figure 2:
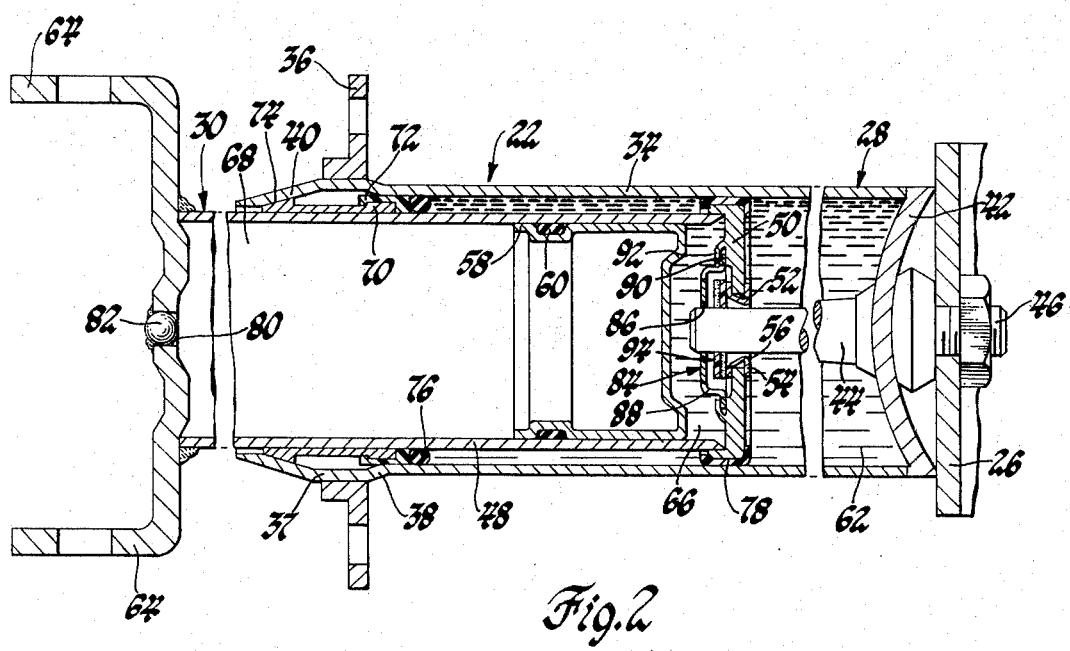
FIG. 2 is an enlarged sectional view taken generally along the plane indicated by lines 2—2 in FIG. 1 and showing the unit in a fully extended condition.

As seen best in FIGS. 1 and 2, the energy absorbing units 22 are identical and each includes a cylinder tube subassembly 28 having telescopically disposed thereon a piston tube subassembly 30, the forward end of each piston tube subassembly being attached to the bumper bar 20 by a suitable bracket 32. With the bumper bar and energy absorbing units so mounted, any impact forces applied to the bumper bar are transmitted through the energy absorbing units to the vehicle frame, the units being adapted in a manner well known in the art to collapse or displace rearwardly and present a controlled resistance during such displacement to the applied forces thereby serving to dampen or dissipate the kinetic energy of such forces. The displacement, of course, is accompanied by inward telescopic collapse of the piston tube subassembly and the bumper bar relative to the cylinder tube subassembly and the frame.

Referring particularly now to FIG. 2, the cylinder tube subassembly 28 includes a cylinder 34 having welded adjacent its open end a bracket 36 adapted for connection to the front bracket 24 on the frame 10. Generally adjacent the open end of the cylinder tube subassembly 28, the cylinder 34 includes a large diameter portion 37 flanked on opposite sides by a transitional frustoconical portion 38 between the large and small diameter portions of the cylinder 34 and a similarly frustoconical crimp stop portion 40. The rightward or inboard end of the cylinder 34 is closed by a cap 42 rigidly attached to the cylinder, as by welding. Interiorly of the unit, a metering pin 44 is rigidly attached to the cap 42 while exteriorly of the unit cap 42 has rigidly attached thereto a mounting stud 46 adapted for reception in an aperture in the bracket 26 and threaded so as to receive a nut thereon for attachment to the bracket. The metering pin 44 is taped and defines an elongated frustum of a cone, the small diameter of the pin being at the distal end and the large diameter being disposed adjacent the cap 42.

Figure 3:
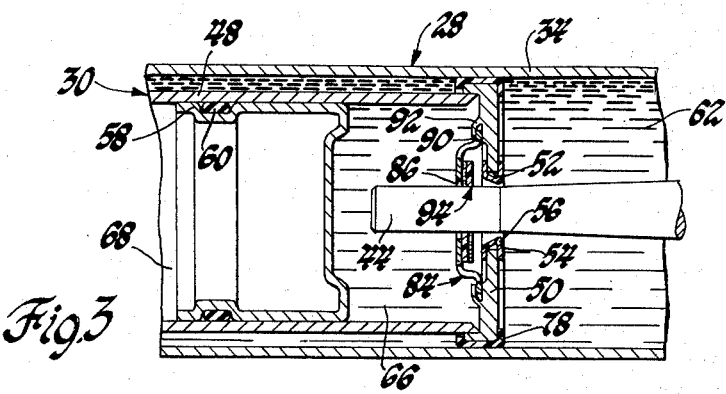
FIG. 3 is an enlarged view of a portion of FIG. 2 showing the valve member in an open position.
Figure 4:
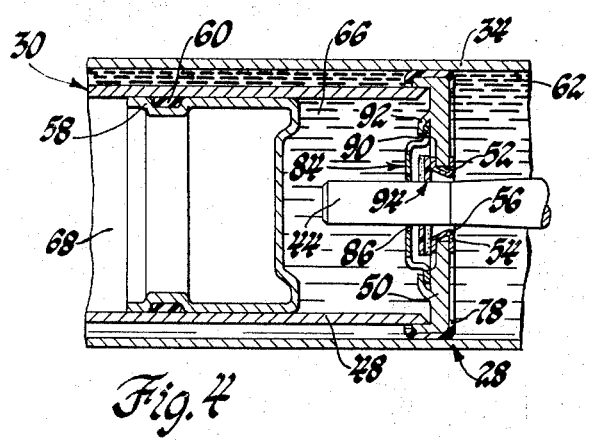
FIG. 4 is similar to FIG. 3, but showing the valve member in a closed position.
Figure 5:
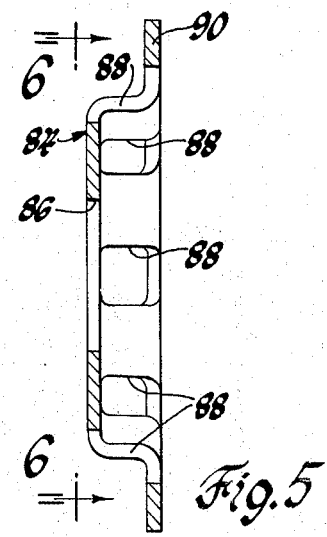
FIG. 5 is an enlarged sectional view of the valve member retaining cage.
Figure 6:
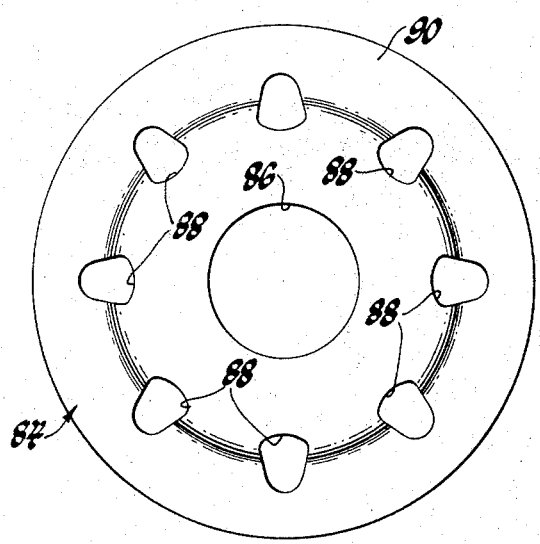
FIG. 6 is a view taken generally along the plane indicated by lines 6—6 in FIG. 5.
Figure 7:
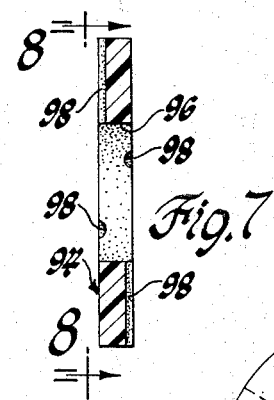
FIG. 7 is an enlarged sectional view of the valve member.
Figure 8:
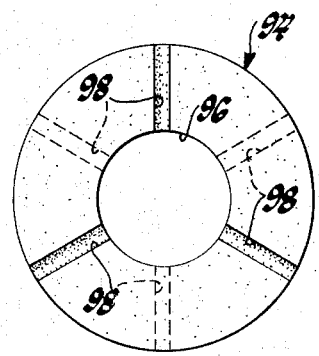
FIG. 8 is a view taken generally along the plane indicated by lines 8—8 in FIG. 7.

As seen best in FIGS. 2, 3 and 4, the piston tube subassembly 30 includes a cylinder 48 having a piston end wall 50 rigidly attached thereto. The end wall 50 includes a bore 52 in which is received a radially slidable annular element 54, the element 54 cooperating with the metering pin in defining a circular, variable area, primary orifice 56. A gas piston 58 is slidably received within the cylinder 48 and is provided with a suitable O-ring or the like seal as at 60. The piston end wall 50 cooperates with the cylinder 34 and the cap 42 in defining a primary chamber 62 while the gas piston 58 cooperates with the piston end wall 50 and a clevis 64, welded to and sealingly closing the outboard end of tube 48, in defining a secondary chamber 66 and a gas chamber 68. An annular stop ring 70 is rigidly attached, as by welding, to the cylinder 48 and includes a raised land over which is received a nylon bearing ring 72. The stop ring further includes a stop portion defining a frustoconical surface 74. An O-ring 76 is received over the cylinder 30 and abutted with an overlap portion of the bearing ring 72. The bearing ring 72 cooperates with a similar bearing ring 78 disposed on the piston end wall 50 in supporting the piston tube subassembly on the cylinder tube subassembly for relatively smooth telescopic sliding movement.

Referring to FIGS. 2, 3 and 4, the primary and secondary chambers 62 and 66 are completely filled with an incompressible working fluid, as for example conventional hydraulic fluid, and the gas chamber 68 is filled with a pressurized gas, the gas being introduced through a port 80 in the clevis 64 which is eventually sealed by a ball 82 welded in the port. The gas forces the piston 58 rightwardly thereby to expel the working fluid from the secondary chamber 66 through the primary orifice 56 and into the primary chamber 62 while at the same time effecting telescopic extension of the piston tube subassembly relative to the cylinder tube subassembly in a well known manner to a fully extended position, FIG. 2, wherein the stop surface 74 engages the stop portion 40. Conversely, impact forces on the bumper bar 20 are transmitted through the clevis 64 to the piston tube subassembly 30 effecting rightward telescopic displacement or collapse thereof relative to the cylinder tube subassembly during which collapse the working fluid is expelled from the primary chamber 62, through the primary orifice 56, and into the secondary chamber 66. As the piston tube subassembly collapses, the metering pin 44 projects further into and through the primary orifice 56 thereby restricting or throttling the flow of working fluid through the orifice to effect primary energy dissipation or absorption. As the working fluid is expelled from the primary chamber, the volume of the secondary chamber increases thereby forcing the piston 58 leftwardly relative to the cylinder 48 to compress the gas in the gas chamber. The compressed gas thereafter functions as a spring to return the piston tube subassembly to the fully extended position when the impact force on the bumper bar ceases.

As seen best in FIGS. 2 through 6, the energy absorbing unit 22 further includes a valve arrangement for restricting the flow of the working fluid from the secondary chamber 66 to the primary chamber 62 under the influence of the compressed gas in the chamber 68 during telescopic extension of the piston tube subassembly. More particularly, the valve arrangement includes a generally cup-shaped cage member 84 having a centrally located circular aperture 86, a plurality of windows 88, and an annular flange 90. The cage member is disposed on the inboard surface of the piston end wall 50 and retained thereon by an annular flange portion 92 of the piston end wall, the flange portion 92 being crimped or spun over the flange 90 to rigidly retain the latter on the piston end wall with the aperture 86 substantially in alignment with the orifice 56 defined by the element 54.

The valve arrangement further includes a circular, plate-like valve element 94 fabricated of conventional elastic or semi-elastic plastic material. The valve element includes a centrally located aperture 96 and a plurality of angularly spaced radially extending grooves 98 in the opposite flat surfaces thereof, the grooves being necessary in only one surface but provided in both to prevent improper installation of the valve element in the valve arrangement. The valve element 94 is freely or floatingly disposed within the cavity defined by the cage member 84 and the inboard surface of the piston end wall 50. The bore 96 receives therethrough the metering pin 44, and is sized to effect interference or sealing engagement on the metering pin at or generally adjacent to the small diameter end of the pin. The elasticity of the valve element permits the latter to be shifted along the entire length of the metering pin. That is, the cross-sectional diameter of the metering pin increases toward the cap 42 because of the taper of the pin. As the valve element is shifted along the pin, the diameter of the aperture 96 elastically expands or contracts, the marginal edge of the aperture constantly sealing against the pin.

Describing now a typical operational sequence of the unit 22, the various elements of the latter normally assume the relative positions shown in FIG. 2 when the unit is in the fully extended condition. As noted hereinbefore, an impact force on the bumper bar effects telescopic collapse of the piston tube subassembly. Simultaneously, the valve element 94 is carried by the metering pin, or if the valve element is not initially in tight-gripping engagement on the pin, by the flow of working fluid through the orifice, to an open position against the inside surface of the cage member 84, FIG. 3. In the open position of the valve element, a substantial gap exists between the inside surface of the piston wall 50 and the valve element, the gap being sufficient to allow virtually unrestricted flow of the working fluid from the primary orifice 56, through the cage windows 88, and into the secondary chamber 66.

As telescopic collapse continues, the metering pin projects further through the valve element and through the aperture 86 in the cage until the impact force on the bumper bar ceases, whereupon relative telescopic extension is initiated by the compressed gas in the chamber 68 as described hereinbefore. Relative telescopic extension, of course, is accompanied by withdrawal of the metering pin from the piston end wall. As the metering pin is withdrawn, the valve element 94 is positively moved by the pin from the open position to a closed position, FIGS. 2 and 4, disposed tightly against a flange portion of the annular element 54. The tight sealing engagement between the bore 96 of the valve element and the metering pin prevents the working fluid from flowing between the valve element and the pin so that the returning fluid is positively directed through a plurality of secondary orifices defined by the grooves 98 and the flange portion of the annular element 54. The dimensions of the grooves are predetermined to insure that a pressure drop is effected between the secondary and primary chambers so that the working fluid is throttled for damping or retarding of the rate of relative telescopic extension.

Having thus described the invention, what is claimed is:

1. In a hydropneumatic type energy absorbing unit including a cylinder tube subassembly and a piston tube subassembly disposed on said cylinder tube subassembly for relative telescopic collapse in an energy absorbing mode from a fully extended position and for automatic relative telescopic extension to the fully extended position, said energy absorbing unit further including a volume of working fluid adapted for throttled flow through a primary orifice during relative telescopic collapse of said piston tube subassembly, the improvement comprising, valve means disposed on said piston tube subassembly for movement between an open position during relative telescopic collapse of said piston tube subassembly and a closed position during relative telescopic extension of said piston tube subassembly, and means on said valve means and on said piston tube subassembly operative in the closed position of said valve means to define a secondary orifice remote from said primary orifice for restricting the flow of said working fluid during relative telescopic extension of said piston tube subassembly thereby to retard the rate of said extension.

2. In a hydropneumatic type energy absorbing unit including a first tube, a second tube disposed on said first tube for relative telescopic collapse and extension, a fixed piston disposed on one end of said second tube and including an aperture therethrough, said first tube and said piston cooperating in defining a primary chamber for a working fluid adapted for flow through said aperture during relative collapse of said second tube, a free piston slidably disposed in said second tube defining a movable partition between a gas chamber and a secondary chamber for said working fluid, said secondary chamber receiving said working fluid during relative collapse of said second tube thereby to compress a gas in said gas chamber for effecting automatic relative extension of said second tube, and a metering pin rigidly attached to said first tube and projecting through said aperture for cooperation with the latter in defining a primary flow orifice for said working fluid, the improvement comprising, a valve member having a radially expandable aperture therein complementary in configuration to the cross-sectional configuration of said metering pin, means supporting said valve member on said fixed piston in said secondary chamber for relative reciprocation between a closed position covering said primary orifice and an open position exposing said primary orifice, said valve member in said expandable aperture slidably and sealingly receiving said metering pin so that said valve member is positively located in the closed position during relative extension of said second tube, and means defining a secondary orifice between said secondary chamber and said primary orifice with said valve member in the closed position for throttling the flow of said working fluid between said secondary chamber and said primary chamber during relative extension of said second tube thereby to retard the rate of said extension.

3. In a hydropneumatic energy absorbing unit including a first tube, a second tube disposed on said first tube for relative telescopic collapse and extension, a fixed piston disposed on one end of said second tube and including an aperture therethrough, said first tube and said piston cooperating in defining a primary chamber for a working fluid adapted for flow through said aperture during relative collapse of said second tube, a free piston slidably disposed in said second tube and defining a movable partition between a gas chamber and a secondary chamber for said working fluid, said secondary chamber receiving said working fluid during relative collapse of said second tube thereby to compress a gas in said gas chamber for effecting automatic relative extension of said second tube, and a metering pin rigidly attached to said first tube and projecting through said aperture for cooperation with the latter in defining a primary orifice for said working fluid, the improvement comprising, a plastic valve disc having a radially expandable aperture therein complementary in configuration to the cross-sectional configuration of said metering pin, means supporting said valve disc on said fixed piston in said secondary chamber for relative reciprocation between a closed position covering said primary orifice and an open position exposing said primary orifice, said valve disc in said expandable aperture slidably and sealingly receiving said metering pin so that said valve disc is positively located in the open position during relative collapse of said second tube and in the closed position during relative extension of said second tube, and means on said valve disc defining a plurality of passages adapted for effecting communication between said secondary chamber and said primary orifice with said valve disc in the closed position, said passages defining a corresponding plurality of secondary orifices for throttling the flow of said working fluid from said secondary chamber to said primary chamber thereby to retard the rate of relative extension of said second tube.

4. In a hydropneumatic energy absorbing unit, the combination comprising, a first tube, a second tube disposed on said first tube for relative telescopic collapse and extension, a fixed piston disposed on one end of said second tube and including an aperture therethrough, said first tube and said piston cooperating in defining a primary chamber for a working fluid adapted for flow through said aperture during relative collapse of said second tube, a free piston slidably disposed in said second tube and defining a movable partition between a gas chamber and a secondary chamber for said working fluid, said secondary chamber receiving said working fluid during relative collapse of said second tube thereby to compress a gas in said gas chamber for effecting automatic relative extension of said second tube, and a metering pin rigidly attached to said first tube and projecting into said aperture, said metering pin being of circular cross-section and cooperating with said piston aperture in defining a variable area primary orifice for said working fluid, a plastic valve disc having a radially expandable circular aperture therein and a plurality of grooves in each surface thereof extending radially between said circular aperture and the outside diameter of said valve disc, a perforated cage member, and means rigidly attaching said cage member to said fixed piston in said secondary chamber, said valve disc being floatingly disposed in said cage member and constrained by the latter for generally reciprocating movement relative to said fixed piston between a closed position covering said primary orifice and an open position exposing said primary orifice, said valve disc in said expandable aperture slidably and sealingly receiving said metering pin so that said valve disc is positively located in the open position during relative collapse of said second tube thereby to permit unimpeded flow of said working fluid from said primary orifice into said secondary chamber through said perforated cage and positively located in the closed position during relative extension of said second tube thereby to direct the flow of said working fluid through a corresponding plurality of secondary orifices defined by said grooves for throttling the flow of said working fluid to retard the rate of relative extension of said second tube.

\* \* \* \* \*